United States Patent
McMasters

(10) Patent No.: US 8,661,839 B2
(45) Date of Patent: *Mar. 4, 2014

(54) BACKGROUND TANK FILL BASED ON REFRIGERANT COMPOSITION

(75) Inventor: Mark McMasters, Owatonna, MN (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 496 days.

This patent is subject to a terminal disclaimer.

(21) Appl. No.: 12/947,531

(22) Filed: Nov. 16, 2010

(65) Prior Publication Data

US 2011/0061407 A1    Mar. 17, 2011

Related U.S. Application Data

(63) Continuation of application No. 11/952,489, filed on Dec. 7, 2007, now Pat. No. 7,832,222.

(51) Int. Cl.
F25B 45/00    (2006.01)
C09K 5/04    (2006.01)

(52) U.S. Cl.
USPC .................................. 62/149; 62/292; 62/114

(58) Field of Classification Search
USPC ........ 62/149, 77, 292, 114; 366/151.1, 151.2, 366/160.1
See application file for complete search history.

(56) References Cited

U.S. PATENT DOCUMENTS

| | | | |
|---|---|---|---|
| 4,261,847 A | 4/1981 | Cooper | |
| 4,316,364 A | 2/1982 | Spauschus | |
| 4,374,089 A | 2/1983 | Iwao et al. | |
| 5,186,012 A | 2/1993 | Czachorski et al. | |
| 5,189,889 A | 3/1993 | Daily | |
| 5,313,800 A | 5/1994 | Howard et al. | |
| 5,371,019 A * | 12/1994 | Manz et al. | 436/126 |
| 5,514,595 A | 5/1996 | Olds et al. | |
| 5,806,322 A | 9/1998 | Cakmakci et al. | |
| 6,018,952 A | 2/2000 | Ide et al. | |
| 6,134,896 A | 10/2000 | Brown et al. | |
| 6,141,977 A * | 11/2000 | Zugibe | 62/149 |
| 6,202,433 B1 * | 3/2001 | Murray et al. | 62/292 |
| 6,237,348 B1 | 5/2001 | Ide et al. | |
| 6,341,629 B1 | 1/2002 | Clark et al. | |
| 7,127,902 B1 | 10/2006 | Levy | |
| 7,174,742 B2 * | 2/2007 | Thomas et al. | 62/475 |
| 7,832,222 B2 * | 11/2010 | McMasters | 62/149 |
| 2006/0137369 A1 | 6/2006 | Galante et al. | |
| 2006/0211897 A1 * | 9/2006 | Cottrell et al. | 585/1 |
| 2006/0289076 A1 | 12/2006 | Jang et al. | |
| 2007/0107448 A1 | 5/2007 | Dresens et al. | |
| 2008/0276634 A1 | 11/2008 | Brown et al. | |

* cited by examiner

Primary Examiner — Chen Wen Jiang
(74) Attorney, Agent, or Firm — Baker & Hostetler LLP

(57) ABSTRACT

A portable recovery unit for automatically filling a background tank of blended refrigerant includes a main tank for holding recovered refrigerant from a vehicle A/C system which has a first chemical composition, and an auxiliary tank for holding an auxiliary supply of fresh refrigerant which has a second refrigerant composition. The auxiliary tank is arranged in fluid communication with the main tank so that fluid can be transferred from the auxiliary tank to the main tank. An electronic controller controls the flow of fluid from the auxiliary tank to the main tank. A refrigerant identifier is coupled to the main tank to sample and analyze the refrigerant in the main tank in order to determine the chemical composition of the refrigerant in the main tank, so the refrigerant in the main tank can be purified to an acceptable level based on that analysis.

20 Claims, 5 Drawing Sheets

BACKGROUND TANK FILL BASED ON REFRIGERANT COMPOSITION

CROSS-REFERENCE TO RELATED APPLICATIONS

This application claims priority to and is a continuation of pending U.S. patent application entitled, Background Tank Fill Based On Refrigerant Composition, filed Dec. 7, 2007, having a Ser. No. 11/952,489, the disclosure of which is hereby incorporated by reference in its entirety.

FIELD OF THE INVENTION

The disclosure relates generally to automotive vehicle air conditioning systems, and more specifically to refrigerant recovery units for recovering and recycling blended refrigerant from an automotive vehicle air conditioning (hereinafter "A/C") system.

BACKGROUND OF THE INVENTION

Automotive vehicle A/C systems require maintenance. Maintenance includes refrigerant recovery, evacuation and recharging of the A/C system. Portable refrigerant recovery units are used in connection with this maintenance. The refrigerant recovery units connect to the A/C system of the automotive vehicle to recover refrigerant out of the system, separate out contaminants and oil, and recharge the system with additional refrigerant.

SUMMARY OF THE INVENTION

At least one embodiment of the disclosure is a unit for recovering refrigerant from a vehicle A/C system, which includes a first container for holding a primary supply of refrigerant having a first refrigerant composition, and a second container for holding a secondary supply of refrigerant having a second refrigerant composition. The second container is in fluid communication with the first container so fluid can be transferred from the second container to the first container. An electronic controller means is provided for controlling the transfer of fluid from the second container to the first container. A composition analyzing device is operatively engaged to the first container and constructed and arranged to determine the chemical composition of the refrigerant in the first container.

Other embodiments provide, a method for using a refrigerant recovery unit for adjusting a chemical composition of refrigerant recovered from a refrigerant system comprises weighing the recovered refrigerant to obtain a weight; comparing the weight of the recovered refrigerant to a minimum weight; analyzing the chemical composition of the recovered refrigerant; and comparing the chemical composition of the refrigerant to a target composition.

Still other embodiments show a method for using a refrigerant recovery unit to adjust the composition of a recovered refrigerant comprises weighing the recovered refrigerant; comparing the weight of the recovered refrigerant to a minimum weight; adding a recharging refrigerant to the recovered refrigerant to form a combined refrigerant, the recharging refrigerant having a predetermined chemical composition of chemical components by percentage of weight of each component; weighing the combined refrigerant; and comparing the weight of the combined refrigerant with a maximum weight.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
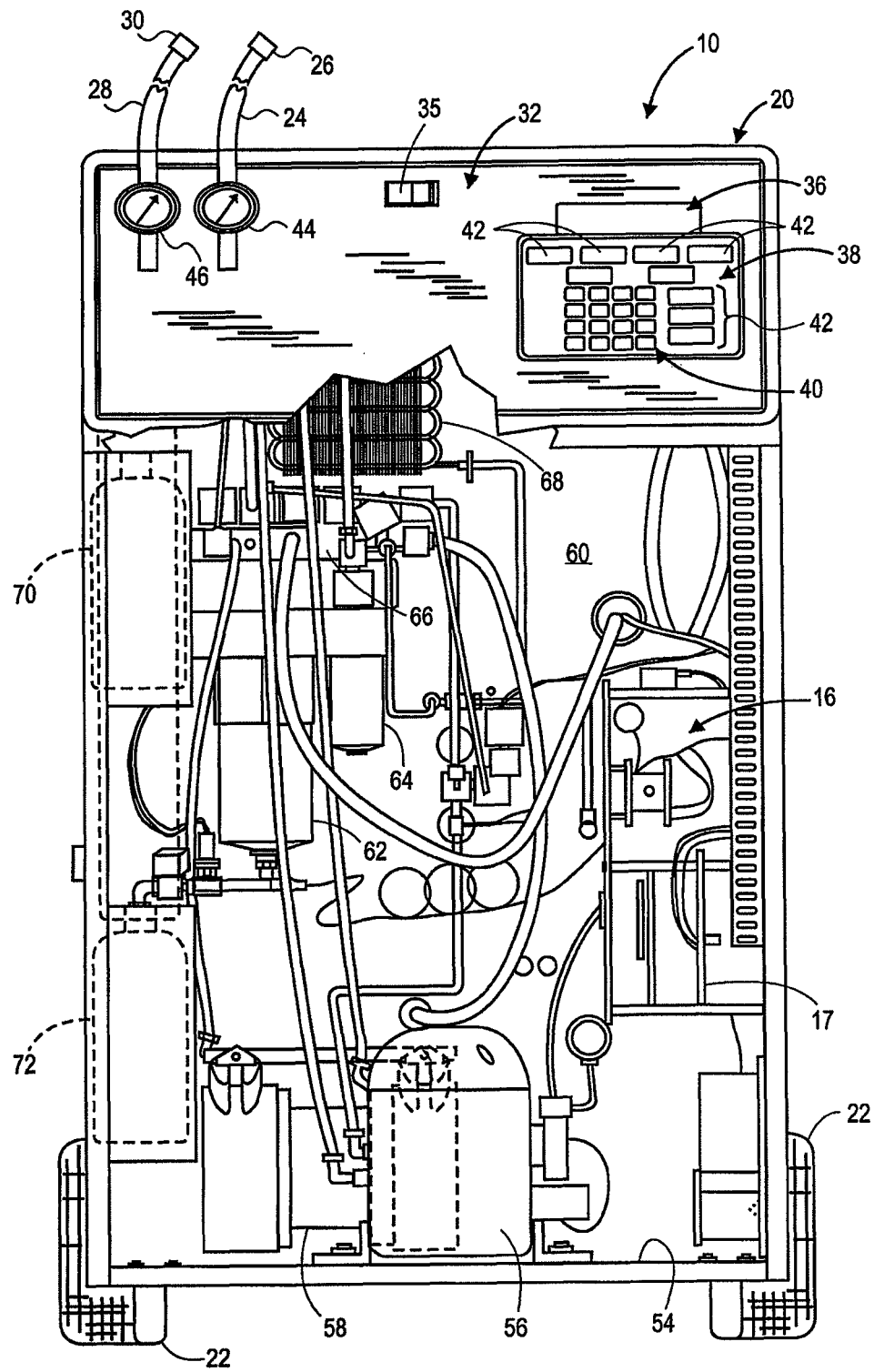
FIG. 1 is a fragmentary front plan view of an example refrigerant recovery unit shown with a portion of the front cover removed to illustrate major components of the unit.
Figure 2:
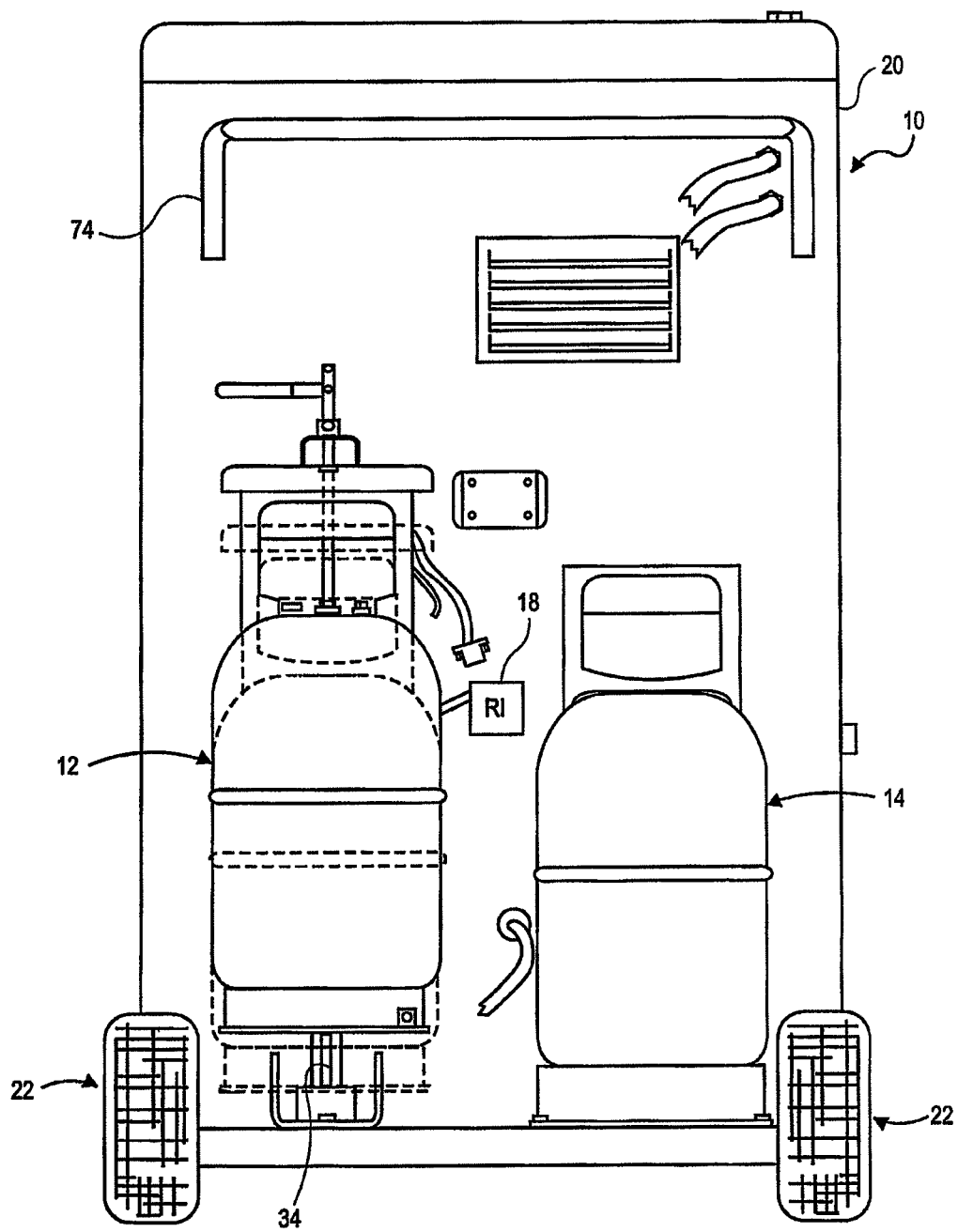
FIG. 2 is a fragmentary rear plan view of the refrigerant recovery unit shown in FIG. 1.

The invention will now be described with reference to the drawing figures, in which like numerals refer to like parts throughout. FIGS. 1-2 show a portable recovery unit 10 for recovering and recycling refrigerant from a refrigerant system, such as in an automotive vehicle. The unit 10 includes a first container or main tank 12 for holding a primary supply of refrigerant. The main tank 12 may also be referred to as an internal storage vessel (ISV). The primary supply of refrigerant or recovered refrigerant contains refrigerant that has been recovered from the A/C system. The unit 10 also includes a second container or auxiliary tank 14 for holding a secondary supply of refrigerant. The secondary supply of refrigerant has a known chemical composition, and is sometimes referred to as fresh refrigerant, virgin refrigerant or recharging refrigerant. The auxiliary tank 14 is arranged in fluid communication with the main tank 12 so fluid can be transferred from the auxiliary tank 14 to the main tank 12. An electronic controller means in the form of an electronic controller 16 for controlling the transfer of fluid from the auxiliary tank 14 to the main tank 12 based on refrigerant composition is provided. A composition analyzing device 18 is operatively engaged with the main tank 12 and constructed and arranged to determine the chemical composition of the refrigerant in the main tank 12.

Details of the structure and operation of the example embodiment of refrigerant recovery unit 10 is illustrated in several of the figures. FIG. 1 shows one example of a refrigerant recovery unit 10 for servicing a refrigerant system of a vehicle A/C system. The refrigerant recovery unit 10 is a machine mounted within a cabinet 20 supported by a pair of wheels 22, such that it is portable. The refrigerant recovery unit 10 may include a high pressure hose 24, typically color coded red, with a coupling 26 for coupling to the vehicle's high pressure port and a low pressure hose 28, typically color coded blue, having a coupling 30 for coupling to the low pressure port of the vehicle's refrigerant circuit. In some refrigerant systems, there may be only one port, for example, where the recovery or low pressure port is eliminated. In such systems, the refrigerant recovery unit may be configured with one hose, in accordance with the principles of the invention. The front panel of the cabinet 20 is shown broken away in FIG. 1 to show the major elements of the refrigerant recovery unit 10.

Figure 4:
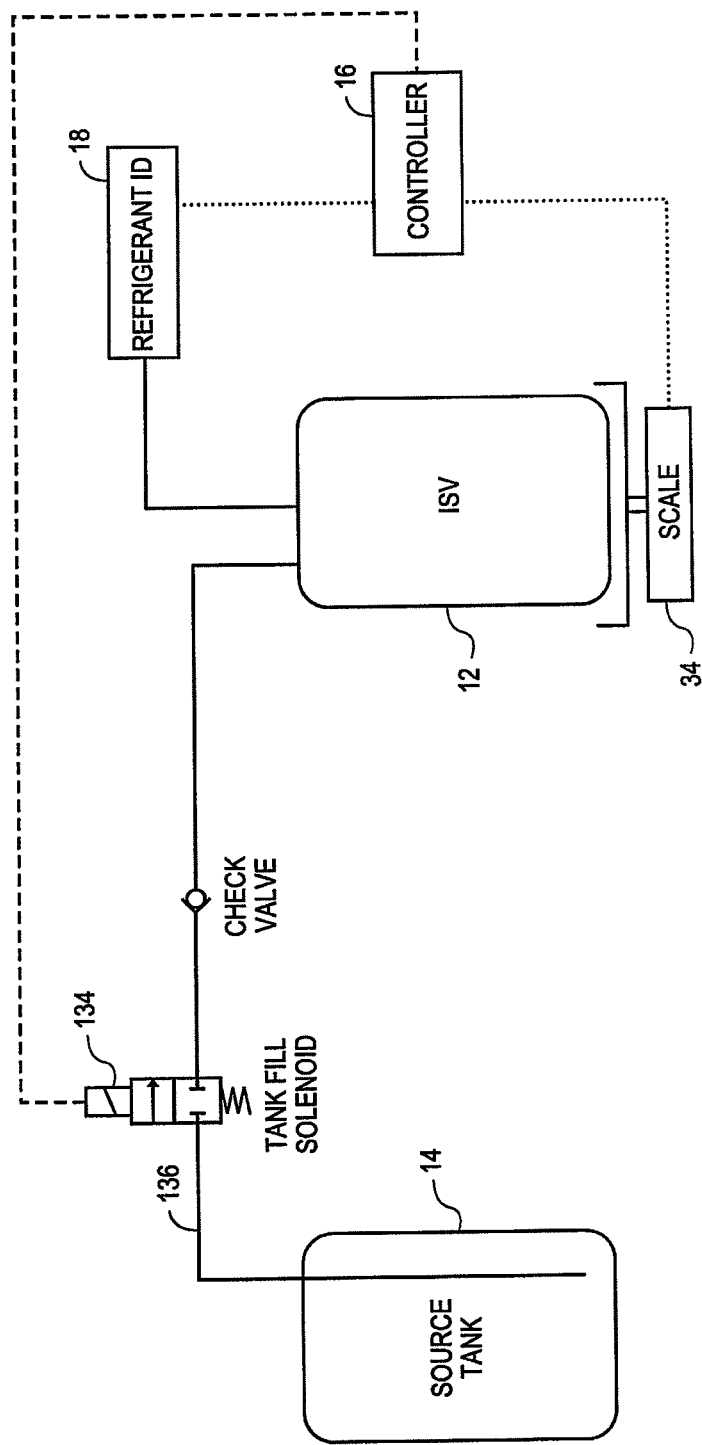
FIG. 4 is a schematic diagram of a portion of the diagram shown in FIG. 3 relating to the automatic filling aspect of the main tank based on refrigerant composition.

The refrigerant recovery unit 10 includes the electronic controller 16 including a microprocessor on a circuit board 17 for controlling an electromechanical solenoid valve 134, shown in the flow diagram of FIG. 4. Optionally, the controller may include a memory unit to store software and data, and the microprocessor may be coupled to the memory unit for executing the software stored in the memory unit. The electronic controller receives data signals from the pressure sensors and control switches on the control panel 32, shown in FIG. 1, as well as from the composition analyzing device 18, and a weighing device 34. The composition analyzing device may be an infrared analyzing device, for example, which analyzes the refrigerant composition with gas chromatography, although this is not the only way the refrigerant can be sampled. The weighing device is the example embodiment is a load cell, but the weighing device can be an electronic scale or any other type of weighing device configurable to transmit a weight data signal to the controller 16. The control panel 32 includes an on/off switch 35 and a display 36 for displaying the operational status of the machine's operation. The display may be an LCD display or other suitable electronic display that is coupled to the controller 16 by way of a conventional input/output circuit. The display panel 30 further includes a switch panel 38 having a conventional keyboard 40, and a plurality of pushbutton switches 42 for controlling the operation of the unit 10 through its various phases of operation and/or for selecting parameters for display. The keyboard 40 in conjunction with operational switches 42 and display 36 allow the operator to enter the desired operational parameters for the unit 10 according to manufacturer specifications for the servicing of an A/C system in a particular vehicle.

The input hoses 24 and 28 are coupled to mechanical pressure gauges 44 and 46, respectively, which are mounted on the front panel of refrigerant recovery unit 10, as seen in FIG. 1. In addition, electrical pressure transducers 44' and 46' are coupled to the hoses 24 and 28, and are coupled to the controller 16 through conventional input/output circuits to provide the controller 16 with pressure information during operation of the unit 10. Gauges 44 and 46 provide the operator with a conventional analog display of the pressure as well. Mounted to the top surface 48 of cabinet 20 is a sight gauge 50 which also includes an integral replaceable filter cartridge 52 mounted to the cabinet 20 for filtering particulate material from the refrigerant during the flushing cycle.

Mounted to the floor 54 of cabinet 20 is a compressor 56 and a vacuum pump 58. Behind the front of cabinet 20 on floor 54, is mounted the main tank 12 of refrigerant (FIG. 2) for the supply of refrigerant to the system being serviced. Also mounted adjacent the main tank 12 is the auxiliary supply tank 14 which supplies additional refrigerant to the main tank 12, as described in greater detail below. Mounted to the inside of rear wall 60 of cabinet 20 is an oil accumulator tank 62, a compressor oil separator filter 64, a manifold 66 (shown as a node in FIG. 3), and a condenser 68. In addition, a fresh oil canister 70 is mounted within a side compartment of cabinet 20. A recovery oil container 72 is mounted on the lower part of the cabinet 20 to receive oil drained from the accumulator tank 62.

Figure 3:
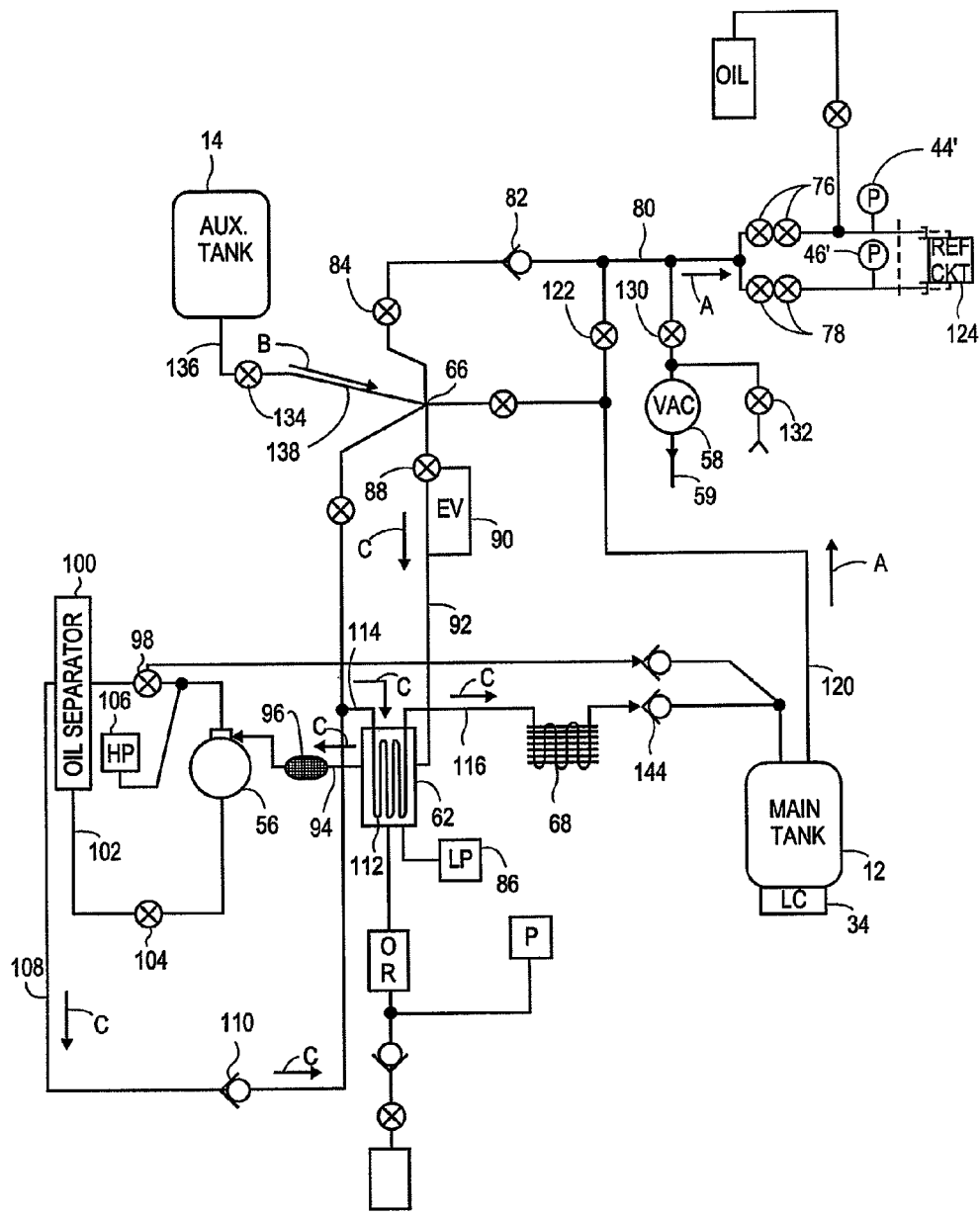
FIG. 3 is a flow diagram of the refrigerant recovery unit shown in FIGS. 1 and 2.

As shown in FIG. 2, the main tank 12 rests on the weighing device 34, which in this example is load cell. The weighing device 34 provides a weight data signal to the controller 16 such that the weight of the tank comprising its tare weight plus the weight of refrigerant therein is monitored by the controller 16. In addition, the composition analyzing device 18 is coupled to the main tank 12 and coupled to the controller 16 to provide a signal to the controller 16 indicating the chemical composition of the refrigerant in the main tank 12. Mounted adjacent the main tank 12 is an auxiliary tank 14 which is plumbed to the main tank 12, as shown in FIG. 3. High pressure hoses and connectors together with control valves couple tank 14 to tank 12. Refrigerant recovery unit 10 also includes a handle 74 to facilitate portability of the refrigerant recovery unit 10.

Figure 5:
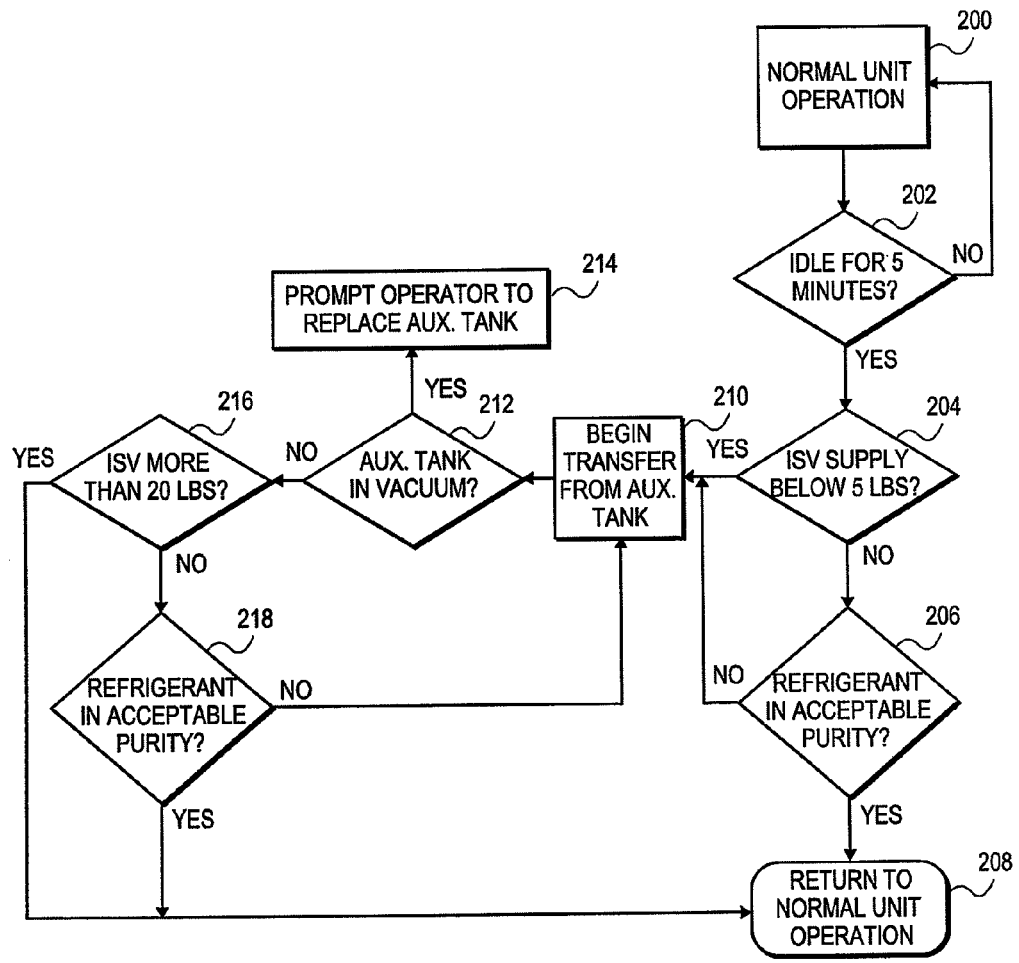
FIG. 5 is a flow chart illustrating an example of operations that may be performed by a refrigerant recovery cart for transferring refrigerant from the auxiliary tank to the main tank based on refrigerant composition.

Having briefly described the major components of the refrigerant recovery unit 10 shown in FIGS. 1 and 2, a more detailed description of the system follows in connection with FIG. 3, followed by the specific operation of the system of the refrigerant additional system as described in connection with FIGS. 4 and 5.

Initially, the hoses 24 and 28 are coupled to the vehicle and the recovery cycle is initiated by the opening of the dual back-to-back high pressure and low pressure solenoids 76, 78, respectively (FIG. 3). This allows the refrigerant within the vehicle to flow through conduits 80 through check valve 82 and recovery valve 84 into the manifold 66. The refrigerant then flows through valve 88 and unit 90 via conduit 92 into the accumulator tank 62 where it travels through an output conduit 94 through a water separating molecular sieve 96 to the input of compressor 56. Refrigerant is drawn through the compressor 56 through a valve 98 and through the oil separating filter 100, which circulates oil back to the compressor 56, through conduit 102 through oil return valve 104. The refrigerant recovery unit 10 may optionally include a high pressure switch 106. Transducer 106 is coupled to the microprocessor which is programmed to determine the upper pressure limit of, for example, 435 psi to shut down the compressor 56 in the event the pressure becomes excessive. The compressed refrigerant then exits the oil separator 100 through conduit 108, travels through check valve 110 and then through a heating coil 112 in accumulator tank 62 via conduit 114. The refrigerant recovery unit 10 optionally includes a low pressure switch 86 that senses the pressure and provides an output signal coupled to the microprocessor through a suitable interface circuit programmed to detect when the pressure has recovered refrigerant down to 13 inches of mercury. The heated compressed refrigerant flowing through heating coil 112 assists in maintaining the temperature in accumulator tank 62 within a working range. The refrigerant then flows through conduit 116 to the condenser 68 which cools the compressed refrigerant which next flows through check valve 144 and into the main tank 12.

The evacuation cycle begins by the opening of solenoids 76 and 78 and valve 130, leading to the input of vacuum pump 58. Prior to opening valve 130, air intake valve 132 is opened, allowing the vacuum pump 58 to start up exhausting air through outlet 59. The vehicle system 124, which is at a relatively low pressure at the end of the flush cycle is then evacuated by the closing of valve 132 and the opening of valve 130, allowing the vacuum pump 58 to exhaust any trace gases remaining until the pressure is approximately 29 inches of mercury. When this occurs, as detected by pressure transducers 44' and 46' coupled to the controller 16, the controller 16 actuates valve 130 by turning it off and the recharging cycle begins.

The recharging cycle begins by opening charge valve 122 and solenoids 76 to allow the liquid refrigerant in tank 12, which is at a pressure of approximately 70 psi or above, to flow through conduit 80. The flow is in the direction indicated by arrow A through high-pressure solenoids 76 for a period of time programmed to provide a full charge of refrigerant to the vehicle.

The automatic tank fill structure for filling a tank in the background is now described in connection with FIGS. 3-4 followed by a description of its operation in accordance with the flow chart of FIG. 5. The main tank 12 includes recovered refrigerant. The auxiliary supply tank 14 includes fresh or virgin refrigerant, and is the same type used in the main tank 12. The auxiliary tank 14 is coupled by way of a plumbing connection to the solenoid actuated valve 134 by means of a high pressure conduit 136. A conduit 138 couples the solenoid actuated valve, which is coupled to the microprocessor, to the manifold 66.

The filling path is through the pathway indicated by arrow C, shown in FIG. 3. The controller 16 applies a signal to open the solenoid actuated valve 134, as described in connection with FIG. 4 below When the solenoid actuated valve 134 is opened, refrigerant from the auxiliary tank 14 flows into tank the main tank 12, through conduit 136, valve 134, conduit 138, then through the manifold 66. This path includes the accumulator tank 62, to which a low pressure or vacuum switch 86 is optionally coupled, filter 96, compressor 56, separator 100, back through the cooling coil 112 of accumulator tank 62, through check valve 110, through condenser 68 and check valve 144 into the main tank 12. The low pressure sensor switch 86 also sends a signal to the microprocessor providing an alarm signal to the operator indicating when the auxiliary supply tank 14 is emptied and being pulled into a vacuum. When this occurs, sufficient refrigeration exists in main tank 12 to allow completion of a recharging cycle of the refrigerant circuit, and also allow the operator to reconnect a fresh auxiliary tank 14, as required. For such a purpose, it is understood that tank 14, which can be of a conventional design, includes a shut-off valve for coupling conduit 136 thereto.

This transfer process is controlled by the controller 16 which actuates the solenoid actuated valve 134 to fill the main tank 12 based on the composition data signal received from the composition analyzing device 18, coupled to the main tank 12. This is not the only way to fill the main tank 12, the controller could operate to fill the main tank 12 based on weight data received from the load cell. The composition analyzing device 18 or refrigerant identifier is coupled to the main tank and operatively engaged to the controller 16 to provide a composition data signal to the controller 16. The composition analyzing device 18 is continuously monitoring the refrigerant composition, although continuous monitoring is not required. The composition analyzing device 18 could sample the refrigerant composition at discrete time intervals.

The main tank 12 is arranged on a weighing device, such as a scale or load cell. The weighing device provides a weight data signal to the controller 16.

The operation of the system to incrementally add refrigerant from the auxiliary tank 14 to main tank 12, in addition to initially filling the main tank 12, is now described in connection with FIG. 5. Such operation assures that the main tank 12 will always have an adequate supply of refrigerant for the next service of a refrigeration circuit.

The programming of the microprocessor begins with the normal operation of the refrigerant recovery unit 10 through a recovering/recharging mode, as indicated by block 200. The program then determines if the unit 10 has been in operation for five minutes or more, as indicated by block 202. Although the period of idling is selected to be five minutes in this example, a shorter or longer period of time may also be selected in accordance with principles of the invention. If the unit 10 has not been idling for the requisite period of time, for example, when there is an extended period of time between one vehicle service and the next and the refrigerant recovery unit 10 has been shut-off, the unit 10 returns to the normal unit operation 200. If the refrigerant recovery unit 10 has been idle for five minutes, the program determines, as indicated by block 204, the weight of the refrigerant in the main tank 12, as determined by a signal from the load cell 34. After recharging a vehicle refrigerant system, it may be that the refrigerant recovery unit 10 is low on refrigerant in the main tank 12. In such a case, there may be an insufficient amount of refrigerant in the main tank 12 to complete the next servicing. If the supply remains above a predetermined minimum weight, in this example five pounds, the refrigerant recovery unit 10 determines if the refrigerant in the main tank 12 has an acceptable level of purity, as indicated by block 206. This is important for blended refrigerants. Blended refrigerant has multiple chemical components that will separate when they leak from an A/C system or are recovered; that is, one component tends to bleed off more than another due to the different densities of the components. If the purity level is acceptable, meaning it falls within a target range of a refrigerant composition, then the refrigerant recovery unit 10 returns to normal unit operation 208. The target composition may be in terms of percentage by weight composition of an ideal composition of the blended refrigerant. If the supply of refrigerant in the main tank 12 is below five pounds, then a transfer of refrigerant is initiated from the auxiliary tank 14 to the main tank 12, as indicated by block 210. The transfer is initiated by actuating the solenoid actuated valve 134, which is controlled by the controller 16. Optionally, the program continues testing to determine whether the low pressure sensor 86 indicates that tank 14 is in a vacuum or below atmospheric pressure as indicated by block 212. If it is, the controller 16 sends a signal to display 32 to prompt the operator to replace the refrigerant supply tank 14, as indicated by block 214. However, it is to be understood that blocks 212 and 214 are not required, and that these steps can also be modified. If the low pressure sensor 86, however, does not detect a vacuum condition in the manifold 66 coupled to the auxiliary tank 14 when valve 92 is operated, the program then determines, as indicated by block 216, to determine whether the supply of refrigerant in the main tank 12 is above a predetermined maximum weight, in this example twenty pounds. Twenty pounds, in this example, represents a full or nearly full tank of refrigerant. If the supply of refrigerant in the main tank 12 is above twenty pounds, the program returns to normal unit operation 208. If this condition is not met, the program again samples the purity level of the refrigerant in the main tank 12 with composition analyzing device 18, as indicated by block 218. If the purity level is acceptable, the unit 10 then returns to normal unit operation 208. However, if the purity level is not acceptable, the system returns to block 210 to initiate a transfer of additional refrigerant from the auxiliary tank 14 to the main tank 12, effectively diluting the refrigerant in the main tank 12 to achieve the desired purity level. However, there may be some instances in which the change in composition of the refrigerant is too severe for recycling with the refrigeration recovery unit 10, in which case, the refrigerant in the main tank 12 would have to be returned to the manufacturer or other party for purification. Thus, the solenoid actuated valve 134 will be actuated during the normal operation through the flow path indicated by arrow C to draw additional refrigerant as required to the main tank 12.

Thus, with the system of the present invention, a supply of refrigerant with an acceptable purity level remains available during all operating conditions, which assures uninterrupted servicing of a refrigerant system of a vehicle or other system being serviced.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A refrigerant recovery system, comprising:
    a composition analyzing device configured to analyze a chemical composition of a first refrigerant;
    a controller, of the refrigerant recovery system, operatively connected to the composition analyzing device to receive a signal from the composition analyzing device to communicate to the controller the chemical composition of the first refrigerant; and
    a valve and conduit system, of the refrigerant recovery system, configured to selectively place the first refrigerant in fluid communication with a second refrigerant, wherein the valve and conduit system is operatively connected to the controller to allow the controller to operate the valve and conduit system to allow a certain amount of the first and second refrigerants to mix together.

2. The refrigerant recovery system of claim 1, wherein the controller is configured to allow the first and second refrigerants to achieve a target chemical composition.

3. The refrigerant recovery system of claim 1, further comprising a first and second tank configured to contain one of the first and second refrigerants.

4. The refrigerant recovery system of claim 3, wherein the first and second refrigerants mix together, in one of the first and second tanks.

5. The refrigerant recovery system of claim 3, further comprising a weighing device configured to weigh one of the first and second tanks.

6. The refrigerant recovery system of claim 1, further comprising an oil separator configured to separate oil from one of the first and second refrigerants.

7. The refrigerant recovery system of claim 1, wherein the composition analyzing device is a refrigerant identifier.

8. The refrigerant recovery system of claim 1, wherein the composition analyzing device is an infrared analyzing device.

9. The refrigerant recovery system of claim 1, wherein the valve and conduit system includes a solenoid actuated valve.

10. The refrigerant recovery system of claim 9, wherein the solenoid actuated valve is operatively connected to the controller.

11. The refrigerant recovery system of claim 1, wherein the valve and conduit system includes a check valve.

12. A refrigerant recovery system, comprising:
    means for analyzing a composition configured to analyze a chemical composition of a first refrigerant;
    means for controlling, of the refrigerant recovery system, operatively connected to the means for analyzing to receive a signal from the means for analyzing to communicate to the means for controlling the chemical composition of the first refrigerant; and
    means for valving configured to selectively place the first refrigerant in fluid communication with a second refrigerant, wherein the means for valving is operatively connected to the means for controlling to allow the means for controlling to operate the means for valving to allow a certain amount of the first and second refrigerants to mix together.

13. The refrigerant recovery system of claim 12, wherein the means for controlling is configured to allow the first and second refrigerants to achieve a target chemical composition.

14. The refrigerant recovery system of claim 12, further comprising a first and second tank configured to contain one of the first and second refrigerants.

15. The refrigerant recovery system of claim 14, wherein the first and second refrigerants mix together, in one of the first and second tanks.

16. A refrigerant recovery unit, comprising:
    a composition analyzing device configured to analyze a chemical composition of a first refrigerant contained in a refrigerant container;
    a controller, of the refrigerant recovery unit, operatively connected to the composition analyzing device to receive a signal about the chemical composition of the first refrigerant from the composition analyzing device;
    a scale, of the refrigerant recovery unit, configured to weigh the refrigerant container, wherein the scale communicates with the controller, which determines based on a measured weight of the refrigerant container when to add a second refrigerant; and
    a valve and conduit system, of the refrigerant recovery unit, configured to selectively place the first refrigerant in fluid communication with the second refrigerant, wherein the valve and conduit system is operatively connected to the controller that allows a certain amount of the first and second refrigerants to mix together in the refrigerant container.

17. The refrigerant recovery unit of claim 16, wherein the refrigerant container is located within the refrigerant recovery unit.

18. The refrigerant recovery unit of claim 16, wherein the controller adds the second refrigerant when the chemical composition of the first refrigerant is below a predetermined purity level.

19. The refrigerant recovery unit of claim 16, wherein the second refrigerant is added incrementally to the refrigerant container.

20. The refrigerant recovery unit of claim 16, wherein the second refrigerant is stored in an auxiliary tank.

* * * * *